US009133616B2

(12) United States Patent
Cheung et al.

(10) Patent No.: US 9,133,616 B2
(45) Date of Patent: Sep. 15, 2015

(54) HIGH PERFORMANCE CEMENTITIOUS MATERIALS FOR FLOORING UNDERLAYMENT WITH ENHANCED IMPACT SOUND INSULATION

(71) Applicant: Nano and Advanced Materials Institute Limited, Hong Kong (CN)

(72) Inventors: Kwok Fai Cheung, Hong Kong (CN); Kin Ying Christopher Leung, Hong Kong (CN); Ka Cheong Ricky Luk, Hong Kong (CN); Yuk Lam Pang, Hong Kong (CN)

(73) Assignee: NANO AND ADVANCED MATERIALS INSTITUTE LIMITED, Hong Kong (CN)

( * ) Notice: Subject to any disclaimer, the term of this patent is extended or adjusted under 35 U.S.C. 154(b) by 0 days.

(21) Appl. No.: 14/449,170

(22) Filed: Aug. 1, 2014

(65) Prior Publication Data

US 2015/0176270 A1    Jun. 25, 2015

Related U.S. Application Data

(60) Provisional application No. 61/964,097, filed on Dec. 23, 2013.

(51) Int. Cl.
*E04F 15/10*    (2006.01)
*E04B 1/86*    (2006.01)
*E04F 15/22*    (2006.01)

(52) U.S. Cl.
CPC .................. *E04B 1/86* (2013.01); *E04F 15/105* (2013.01); *E04F 15/107* (2013.01); *E04F 15/225* (2013.01)

(58) Field of Classification Search
CPC ........ C04B 28/02; C04B 18/22; C04B 14/06; C04B 28/14; C04B 41/5323; E04F 15/105; E04F 15/107
USPC ..................................... 52/745.05, 403.1, 145
See application file for complete search history.

(56) References Cited

U.S. PATENT DOCUMENTS

| 4,457,120 A | * | 7/1984 | Takata ......................... 52/309.4 |
| 5,187,905 A | * | 2/1993 | Pourtau et al. .................. 52/144 |

(Continued)

FOREIGN PATENT DOCUMENTS

| CN | 103114705 A | 5/2013 |
| DE | 3635434 A1 | 4/1988 |
| DE | 202006009046 U1 | 10/2006 |

OTHER PUBLICATIONS

Asdeubali, F., D'Alessandro, F., Baldinelli, G., Thermo-acoustic properties of floors made of concrete and scraps from electric wires (2009).

(Continued)

*Primary Examiner* — Jeanette E Chapman
*Assistant Examiner* — Daniel Kenny
(74) *Attorney, Agent, or Firm* — Eagle IP Limited; Jacqueline C. Lui

(57) ABSTRACT

An in-situ cast floor underlayment is disclosed in this invention, wherein the floor underlayment comprises a cemented rubber layer, which further comprises rubber granules and cementitious binder. The floor underlayment further comprises a highly deformable cemetitious composite layer on top of the cemented rubber layer for the protection thereof. The rubber granules are pre-treated such that a better interaction between the rubber granules and the cementitious binder is achieved. A method of installing the in-situ casted floor underlayment is also disclosed.

6 Claims, 8 Drawing Sheets

(56) References Cited

U.S. PATENT DOCUMENTS 5,391,226 A * 2/1995 Frankowski .................. 106/696
6,920,723 B2 * 7/2005 Downey .......................... 52/144
7,987,645 B2 * 8/2011 Tinianov ...................... 52/403.1

OTHER PUBLICATIONS

Bettarello F, C. M., Preliminary Acoustic tests on resilient materials: comparison between common layers and nano-structured layers.,—(2010).

Björk, F., Eriksson, C.-A., Karlsson, S. & Khabbaz, F., Degradation of components in flooring systems in humid and alkaline environments, Construction and Building Materials 17, 213-221 (2003).

Branco, F. G. & Godinho, L., On the use of lightweight mortars for the minimization of impact sound transmission, Construction and Building Materials 45, 184-191 (2013).

Khatib, Z. & Bayomy, F., Rubberized Portland Cement Concrete, Journal of Materials in Civil Engineering 11, 206-213 (1999).

Maderuelo-Sanz, R., Martin-Castizo, M. & Vilchez-Gómez, R., The performance of resilient layers made from recycled rubber fluff for impact noise reduction, Applied Acoustics 72, 823-828 (2011).

M. Li, G. Dodd, A simplified approach to impact sound insulation rating without using a tapping machine (2008).

MišKinis, K., Dikavičlus, V., Ramanauskas, J. & Norvaišlenė, R., Dependence between Reduction of Weighted Impact Sound Pressure Level and Specimen Size of Floating Floor Construction, Materials Science 18, (2012).

Pfretzschner, J. & M$^a$. Rodriguez, R., Acoustic properties of rubber crumbs, Polymer Testing 18, 81-92 (1999).

Rushforth, I. M., Horoshenkov, K. V., Miraftab, M. & Swift, M. J., Impact sound insulation and viscoelastic properties of underlay manufactured from recycled carpet waste, Applied Acoustics 66, 731-749 (2005).

Shi, W., Johansson, C. & Sundbäck, U., An investigation of the characteristics of impact sound sources for impact sound insulation measurement, Applied Acoustics 51, 85-108 (1997).

Swift, M. ., Bris, P. & Horoshenkov, K., Acoustic absorption in re-cycled rubber granulate, Applied Acoustics 57, 203-212 (1999).

Warlow, W. J., Harper, F. C. & Pye, P. W., The resistance to wear of flooring materials, Wear 10, 89-102 (1967).

* cited by examiner

HIGH PERFORMANCE CEMENTITIOUS MATERIALS FOR FLOORING UNDERLAYMENT WITH ENHANCED IMPACT SOUND INSULATION

CROSS REFERENCE TO RELATED APPLICATIONS

This application claims the priority of U.S. Provisional Application No. 61/964,097 filed Dec. 23, 2013, the whole of which is hereby incorporated by reference herein.

FIELD OF INVENTION

The present invention generally relates to a concrete panel and a method of making thereof, in particular, an impact sound insulation concrete floor underlayment.

BACKGROUND OF INVENTION

The transmission of air-borne and impact noise from neighboring spaces through walls and floors in interiors becomes a concerning issue. In cities with high population densities, since many residents live in high-rise concrete buildings, the noise problem is more serious. Impact sounds are an impact or mechanical noises generated by, for example, footsteps, movements of furniture and objects dropped on the floors. Impact sounds are easily generated and transmitted to apartments at lower floors in high-rise concrete buildings through the concrete slab because the above mentioned movements are very common in our daily lives.

The impact sound insulation performance is determined in accordance with ISO 140-6:1998 and ISO 717-2:1997 and its standard test is carried out in accredited laboratory. From the mentioned standard tests, the normalized impact sound pressure level (Lw) is measured and calculated. However, standard rooms with two stories are required and specimen size of at least 10 m$^2$ are required for conducting the standard impact sound insulation test. As such, some researchers have simplified the test for measuring the impact sound. For example, a simple test rig can be set up to conduct a comparable assessment of impact sound insulation performance using a drop tube or tapping machine as impact source.

One of the approaches to improve the impact sound insulation is to increase the thickness of concrete. However, this approach is not effective and causes a larger reduction of space in houses. The other common sound-insulating way is to create a flooring system by adding insulating materials like PVC and thermoplastic tiles above concrete slab. Such flooring system may not stand for long period. Further, such flooring system is likely to degrade in an alkaline and humid environment, especially due to alkaline material in concrete.

SUMMARY OF INVENTION

In the light of the foregoing background, it is an object of the present invention to provide an alternative impact sound insulation concrete floor underlayment.

Accordingly, the present invention, in one aspect, is a building including at least one floor underlayment, wherein the floor underlayment includes a cemented rubber layer, which further includes rubber granules and cementitious binder.

In one embodiment, the cemented rubber layer further includes an upper layer and a lower layer, wherein the upper layer includes substantially the rubber granules and the lower layer includes substantially the cementitious binder only.

In another embodiment, the floor underlayment is a seamlessly installed in a room of the building.

In further another embodiment, each of the rubber granules includes a modified surface, wherein the modified surface includes an epoxy layer or hydrolyzed carboxyl groups.

In yet another embodiment, a highly deformable cementitious composite layer is casted on top of the cemented rubber layer.

In another aspect a method of installing an underlayment on a floor in a building is disclosed including a step of a) forming a cementitious binder layer on the floor; b) adding rubber granules onto the cementitious binder layer to form a cementitious-binder-rubber sheet on the floor; and c) settling the cementitious-binder-rubber sheet for a predetermined period of time.

In one embodiment, the method further includes a step of casting a highly deformable cementitious composite layer onto the cemented rubber layer.

In another embodiment, the rubber granules are pre-treated by the steps of a) providing a recycled rubber granules which are selected from the group consisting of Ethylene Propylene Diene Monomer (EPDM) rubber granules, Styrene-butadiene rubber granules, Butyl rubber granules, Silicone rubber granules and any combination thereof; and b) treating the recycled rubber granules with sodium hydroxide solution or calcium hydroxide solution or silane coupling agent.

In yet another aspect a floor underlayment including a cemented rubber layer, which further includes rubber granules and cementitious binder is disclosed.

There are many advantages to the present invention. First, the present invention provides a relatively thin impact sound insulation concrete floor underlayment. Furthermore, the compressive strength of the present invention is high.

Another advantage of the present invention is that the installation time and the labor consumptions are reduced. Further, the floor underlayment of the present invention is environmental friendly.

BRIEF DESCRIPTION OF THE DRAWINGS

For a more complete understanding of the present invention, reference is made to the following detailed description and accompanying drawings, in which.

DETAILED DESCRIPTION OF THE PREFERRED EMBODIMENTS

As used herein and in the claims, "comprising" means including the following elements but not excluding others.

Figure 1:
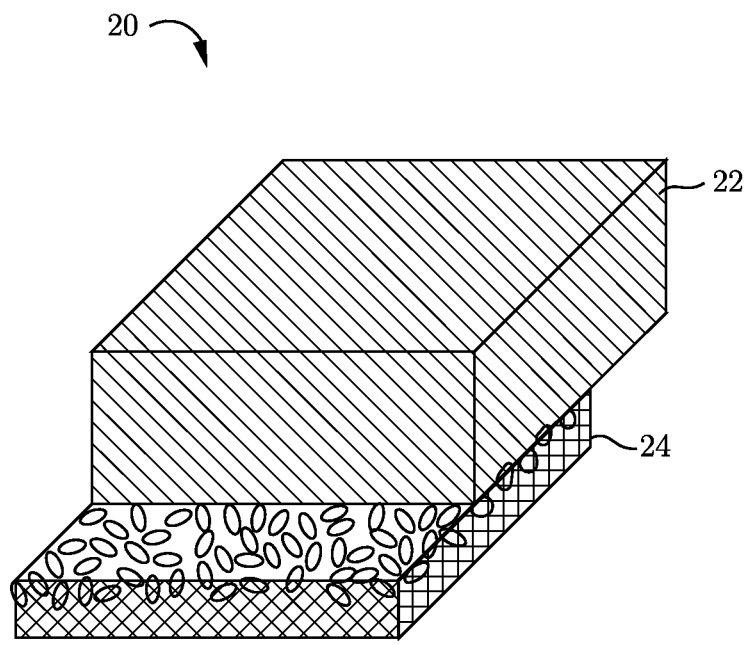
FIG. 1 is a schematic diagram of the floor underlayment according to the present invention.

FIG. 1 shows an impact sound insulation concrete floor underlayment 20 including a fiber reinforced highly deformable cementitious composite (HDCC) 22 layer and a cemented rubber layer 24. The HDCC 22 layer (acting as a floor screed) is formed on top of the cemented rubber layer 24 and is thicker compared to the cemented rubber layer 24. The cemented rubber layer 24 (acting as an impact sound insulated material) is used to absorb impact sound and is installed on a concrete slab as a floor of an apartment of a building. The floor underlayment 20 has an overall thickness between 20-120 mm. The floor underlayment 20 is in-situ installed on a floor of a building.

Figure 2:
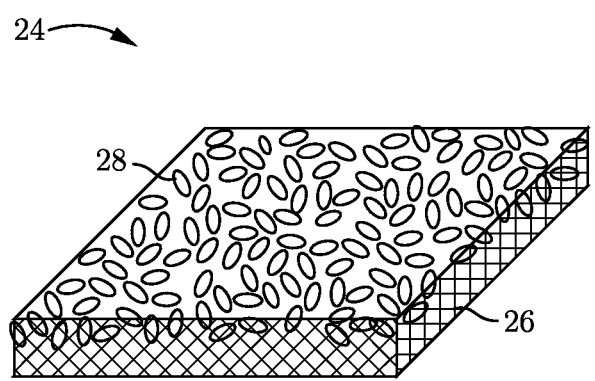
FIG. 2 is a schematic diagram of the cemented rubber layer according to the present invention.

The cemented rubber layer 24 is shown in FIG. 2. The cemented rubber layer 24 includes a layer of cemented rubber cementitious binder (CR cementitious binder) 26 and a layer of rubber granules 28. The rubber granules 28 are mainly disposed on the upper surface of the cemented rubber layer 24 to form an upper layer which is a matrix of the rubber granules 28 and the CR cementitious binder 26. The rubber granules 28 in the upper layer provide a good impact sound absorption. The lower part of the cemented rubber layer 24 is substantially composed of CR cementitious binder 26, which forms a lower layer. The use of the CR cementitious binder 26 reduces both the time and labor consumption during installation of the cemented rubber layer 24 as compared to other conventional method for installing impact sound absorption layers. The CR cementitious binder 26 is made of cement, fly ash, slag, silica fume, sand, superplasticizer, fiber and water. In this present invention, the rubber granules 28 are not mixed into concrete and the rubber content does not have a great influence on the structural properties of concrete. The cemented rubber layer has a reduction in impact sound pressure level of about 1 dB to 35 dB.

Figure 3:
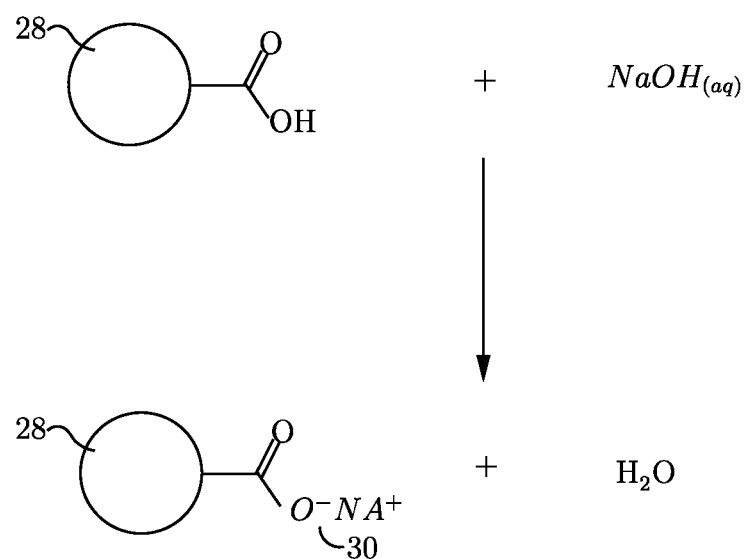
FIG. 3 shows the mechanism of alkaline surface treatment of rubber granules.
Figure 4:
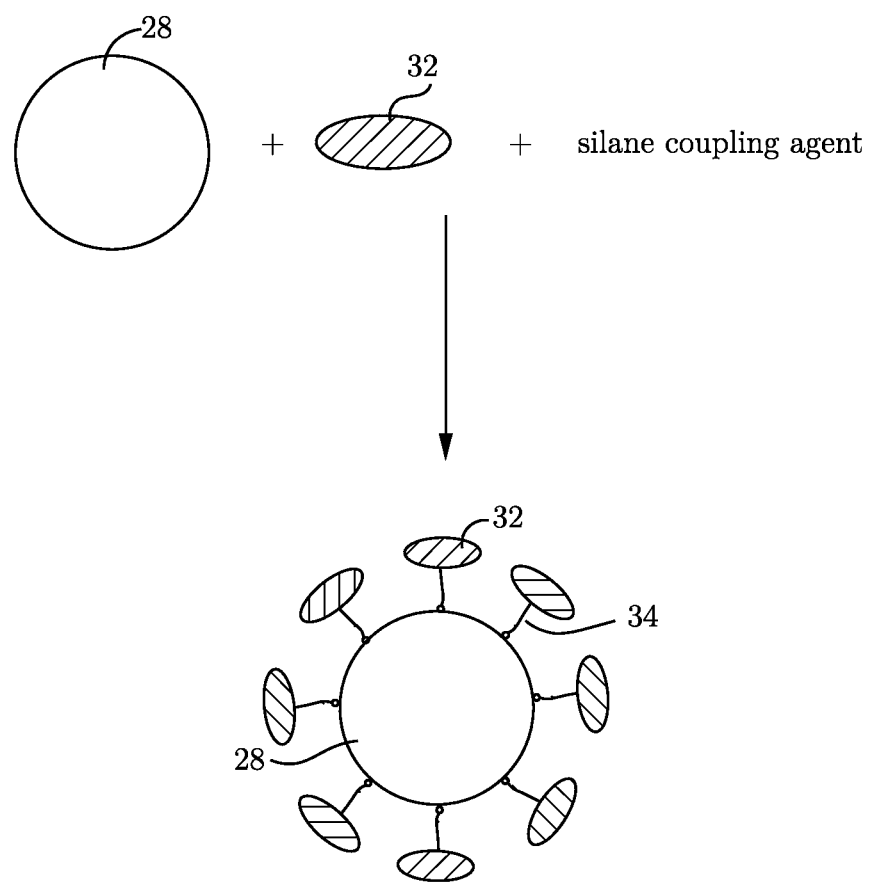
FIG. 4 shows the mechanism of silane surface treatment of rubber granules.

Further, the rubber granules 28 used are recycled rubber. Ethylene Propylene Diene Monomer (EPDM) rubber granules with a size of 2-4 mm are used as the rubber granules 28. To enhance the binding/interaction between the rubber granules 28 and the CR cementitious binder 26, each of the rubber granules 28 surfaces is either treated by alkaline or silane coupling agent. As shown in FIG. 3, when treated by sodium hydroxide (i.e. alkaline), the surface of each of the rubber granules 28 contains at least one hydrolyzed carboxyl groups 30. The hydrolyzed carboxyl groups 30 enhance the hydrophilicity of each of the treated surfaces of the rubber granules 28, facilitating the binding of the rubber granules 28 with the CR cementitious binder 26. When the rubber granules 28 are treated by silane coupling agent, each of the rubber granules 28 contains epoxy layer 34 as shown in FIG. 4. The silane coupling agent used is alkoxysilane with the formula of $(H_2NCH_2CH_2NHCH_2CH_2CH_2Si(OCH_3)_3)$. The epoxy layer 34 enhances the binding between the rubber granules 28 and the CR cementitious binder 26 due to the strength of the interaction formed between the epoxy layer 34 and the hydroxyl group of the cement 32 in the CR cementitious binder 26.

The detailed steps for treating the rubber granules 28 are also disclosed herein. The following steps are used to produce treated rubber granules 28 with at least one hydrolyzed carboxyl group 30. First, Ethylene Propylene Diene Monomer rubber granules used as rubber granules 28 are added to sodium hydroxide NaOH as the alkaline to form a mixture, which is stirred for 10-40 minutes. After the stirring, the treated rubber granules 28 are collected by passing the mixture though a filter paper in a filter funnel. The treated rubber granules 28 are then washed with running de-ionized water and dried in room temperature after washing.

Now the steps used to produce treated rubber granules 28 with epoxy layer 34 are described. First, adding alkoxysilane with the formula of $(H_2NCH_2CH_2NHCH_2CH_2CH_2Si(OCH_3)_3)$ as the silane coupling agent into ethyl alcohol aqueous solution to form a mixture, which is stirred for about 1-20 minutes by using a magnetic stirrer in a container. After that, EPDM rubber granules used as rubber granules 28 are added into the mixture and stirred for 1-30 minutes. Next, the mixture with the rubber granules 28 are heated to 50-100° C. for 1-30 minutes and after that, the heated mixture is refluxed for 10-60 minutes with stirring and cooled down to room temperature. The treated rubber granules 28 are collected through filtration. The collected rubber granules 28 are rinsed with alcohol, for example acetone and dried at 100-120° C. for 8-24 hours.

In summary, the particular composition of the cemented rubber layer 24 is listed below (all percentages listed below are the percentages of the total volume of the cemented rubber layer 24):

1. cement (1-75 percent);
2. fly ash (0-50 percent);
3. slag (0-50 percent);
4. silica fume (0-30 percent);
5. sand (0-75 percent);
6. polycarboxylate ether based superplasticizer with a formula of $(C_4H_6O_2)_n$ and $C_{2n}H_{4n+2}O_{n+1}$ as superplasticizer (0-2 percent);
7. polypropylene fiber as fiber (0-5 percent);
8. water (1-20 percent);
9. EPDM rubber granules as rubber granules 28 (1-80 percent);
10. Sodium hydroxide as alkaline (1-20 percent) or alkoxysilane with the formula of $(H_2NCH_2CH_2NHCH_2CH_2CH_2Si(OCH_3)_3)$ as silane coupling agent (1-20 percent), depending on how the rubber granules 28 are treated.

Further, the cement is hydraulically settable cement (hydraulic cement). The Silica fume has a mean diameter of 20 nm to 200 nm. The sand has a mean diameter of 50 μm to 600 μm. The thickness of cemented rubber layer 24 is between 5-100 mm with compressive strength of 1-75 MPa. The 3-day compressive strength of the cemented rubber layer 24 is about 10-30 MPa which fulfills the expectation of construction industry. The compressive strength of the cemented rubber layer 24 is higher than the compressive strength of the conventional impact sound insulation materials. Due to the aforesaid compressive strength of the cemented rubber layer 24, which is comparable to that of the concrete slab's, the cemented rubber layer 24 can be considered as effective media to transfer the load to structural member without failure by itself. The impact sound reduction of the cemented rubber layer 24 system is 10-30 dB.

Figure 5:
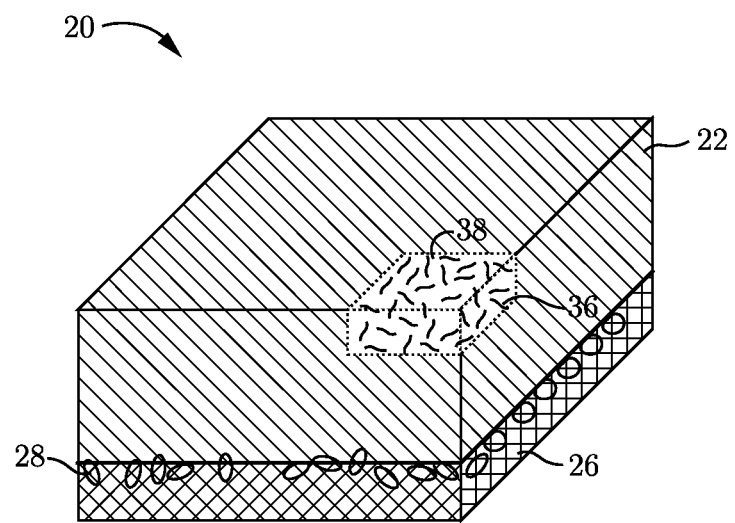
FIG. 5 is a schematic diagram of the short fibers in the HDCC with the cemented rubber layer according to the present invention.

Now on referring to FIG. 5 the HDCC 22 on top of the cemented rubber layer 24 is shown. The HDCC 22 provides protection to the cemented rubber layer 24 and a hard surface for tiles to be installed in concrete buildings. It also serves as a screed of the floor of the building. The HDCC 22 is composed of short fiber 36 which are short discontinuous fiber and HDCC cementitious binder 38. The short fiber 36 has the length of 1 âĂŞ 25 mm. The HDCC cementitious binder 38 is made of a fiber reinforced cementitious composite composed of cement, fly ash, slag, silica fume, sand, water and superplasticizer. Although not shown in FIG. 5, a polyethylene film is disposed between the cemented rubber layer 24 and the HDCC 22.

The particular composition of the HDCC 22 is listed below (all percentages listed below are the percentages of the total volume of the HDCC 22 by volume):

1. cement (1-60 percent);
2. fly ash (0-80 percent);
3. slag (0-80 percent);
4. silica fume (0-20 percent);
5. sand (0-75 percent);
6. polycarboxylate ether based superplasticizer with a formula of $(C_4H_6O_2)_n$ and $C_{2n}H_{4n+2}O_{n+1}$ as superplasticizer (0-2 percent);
7. polyvinyl alcohol short fiber as short fiber (0-5 percent);
8. water (1-30 percent);

Further, the cement is hydraulically settable cement. The fly ash has a mean diameter of 50 μm to 200 μm. The sand has a mean diameter of 50 μm to 450 μm. The thickness of HDCC 22 is between 15-80 mm with a compressive strength (1-60 MPa). The HDCC 22 has good bending deformability 5-20 mm mid-point deflection for the size of 500 m×100 mm×thickness (i.e. 15-80 mm) under four-point bending test.

Due to the combination of the short fiber 36 and the HDCC cementitious binder 38, the HDCC 22 is thinner than the conventional floor screed while not affecting the protection of the cemented rubber layer 24. The thickness of the conventional concrete screed is about 45-60 mm for preventing cracks of the screed on the soft cement rubber layer, while the HDCC 22 reduces the required thickness to 15 mm to 50 mm by forming multiple small fine cracks instead of large cracks. Also, no crack propagates to tiles which are installed on top of the HDCC 22. Further, good deformability of the HDCC 22 is also achieved. By conducting four-point bending test for the HDCC 22 of size 500 mm×100 mm×thickness (i.e. 15-80 mm), the mid-point deflection is about 5-20 mm and multiple fine cracks are developed instead of a main crack in normal concrete screed.

Figure 6:
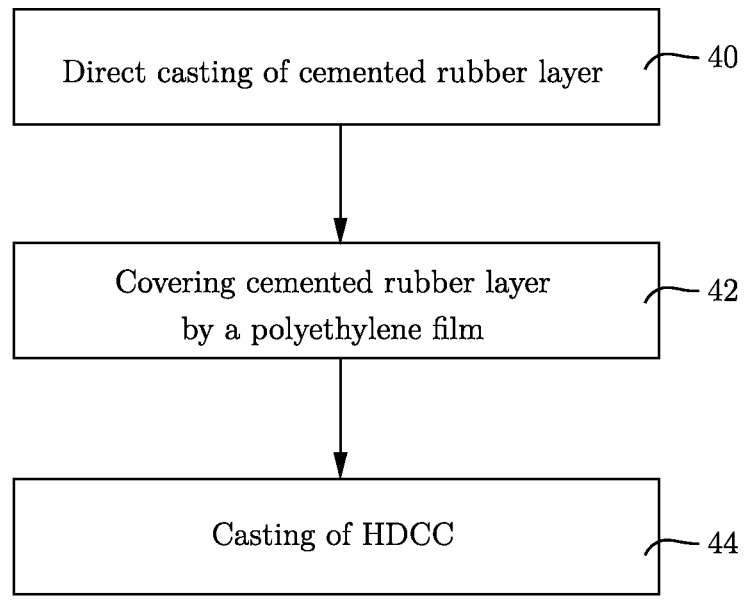
FIG. 6 is a flowing chart of the method of in-situ installation of the floor underlayment according to the present invention.

Now turning to the installation method of the impact sound insulation concrete floor underlayment 20 described above, the floor underlayment 20 is in-situ installed on a floor of a building. FIG. 6 shows the installation method of the present invention that includes three steps, namely, cemented rubber layer casting step 40, polyethylene film covering step 42 and HDCC casting step 44.

In the cemented rubber layer casting step 40, polycarboxylate ether based superplasticizer with a formula of $(C_4H_6O_2)_n$ and $C_{2n}H_{4n+2}O_{n+1}$ is first mixed with water to form a solution. After that, a mortar is formed by adding cement, fly ash, slag, silica fume and sand into the solution. A binder matrix is then formed by adding and mixing polypropylene fiber as the fiber to the mortar. The mixing helps to disperse the fiber uniformly in the mortar such that the fiber is uniformly dispersed inside the binder formed. After the binder matrix is prepared, it is casted on an interested area of the floor of the building and the EPDM rubber granules used as rubber granules 28 (which are treated according to the method mentioned above) are added/dropped on top of the freshly casted binder matrix evenly, thereby forming a layer of rubber granules 28. After the binder matrix is hardened by air dry or curing, the cemented rubber layer 24 is formed, which has the upper layer that is a matrix of the rubber granules 28 and the CR cementitious binder 26 and the lower layer that is substantially CR cementitious binder 26. Due to the difference in the density in which the density of the rubber granules 28 is about 1600 kg/m$^3$ and the density of the CR cementitious binder 26 is over 2200 kg/m$^3$, the rubber granules 28 stay on the top of the CR cementitious binder 26.

After the cemented rubber layer casting step 40, a polyethylene film is used to cover the cemented rubber layer 24 in the polyethylene film covering step 42.

Upon the completion of the aforesaid polyethylene film covering step 42, the HDCC 22 is formed on top of the cement rubber layer and the polyethylene film in the HDCC casting step 44. The HDCC 22 is made by adding short fibers 36 into the ready-mixed cementitious matrix followed by mixing. The mixing steps as mentioned above are mixed by a mixer.

Since the floor underlayment 20 of the present invention is installed in-situ and the binder used in the cemented rubber layer 24 is cementitious binder, there is no gap between the floor underlayment 20 and the concrete slab as the floor of the apartment of the building, in which the floor underlayment 20 is installed thereon. This enhances the efficiency of insulation of the impact sound. Further, the floor underlayment 20 is a continuous sheet (i.e. without gap) formed on the concrete slab as the floor of the apartment of the building as it is directly in-situ casted, which is different from other conventional floor underlayments that is installed as a panel. Particularly, the floor underlayment 20 is installed seamlessly in a room of the building. More particularly, the floor underlayment 20 further has a seamless upper portion which has an upper area being substantially equal to a floor area of the room of the building on which the floor underlayment 20 is installed. It is noted that the cemented rubber layer 24 and the HDCC 22 respectively also have seamless upper portions including upper areas which are substantially equal to the floor area of the room of the building on which the floor underlayment 20 is installed. The use of cementitious binder and direct in-situ casting of the cemented rubber layer 24 and floor underlayment 20 introduces an advantage to the installation method which can reduce both time and labor consumption of installation. Also, the use of cementitious binder in the cemented rubber layer 24 greatly improves the bond between the impact sound insulated layer and the existing concrete slab because both the concrete slab of the floor and CR cementitious binder 26 are cementitious based materials. Secondly, in general, the concrete slab of the floor is not smooth and this causes difficulties for installing the existing commercial impact sound insulated material which is usually in rolled form, onto the floor. Direct casting of cemented rubber layer 24 is feasible without concerning the roughness of the existing concrete slab surface.

Furthermore, recycled materials like recycled rubber granules and fly ash are used. Therefore, the floor underlayment 20 is considered as a 'green' construction product with good impact sound insulation.

EXAMPLE

Hereinafter, a specific example of the present invention will be described by way of Experimental Example. However, the present invention is not limited to this.

Experimental Example 1

The binding of rubber granules 28 by direct casting of the CR cementitious binder 26 is illustrated in this example. The composition design of the cemented rubber layer 24 is shown in Table 1. The cemented rubber layer 24 in this example comprises cement, fly ash, silica fume, sand, water, superplasticizer and Ethylene Propylene Diene Monomer (EPDM) rubber granules.

TABLE 1

| Cement | Fly ash | Silica fume | Sand | Water | Super-plasticizer | EPDM rubber |
|---|---|---|---|---|---|---|
| 1-75% | 0-50% | 0-30% | 0-75% | 0-30% | 0-2% | 0-80% |

The cement used in this example is Type 1 Portland cement (BS 12:1996, 52.5N) from Green Island Cement Co. Limited, Hong Kong. The fly ash is supplied by the CLP Holdings Limited, Hong Kong. The silica fume is supplied by Elkem with band name Grade 920. The silica sand has a size distribution from 150 Îijm to 300 Îijm. The superplasticizer used in this example is Glenium ACE80 which is a polycarboxylate ether polymer from BASF. The EPDM rubber granules are supplied by Guangzhou Chuanao Sports Facilities Co. Ltd with granules sizes of 2-4 mm.

The above mentioned compositions of cemented rubber are prepared and mixed in a Hobart mixer with a planetary rotating blade. Cement, fly ash, silica fume, sand are dry mixed for 3-4 minutes. Superplasticizer is added to the water to form a solution. After dry mix, the solution mentioned above is added to the dry powder with another 5-10 minutes of mixing.

With different designs of composition, the viscosity and workability of the CR cementitious binder 26 can be varied. In this example, a sample of cemented rubber layer 24 with 250 mm×250 mm×15 mm is cast. The CR cementitious binder 26 which is formed as mentioned above is cast into the stainless steel mould. The CR cementitious binder 26 of about 10 mm is formed in the steel mould by the self-leveling binder. The rubber granules 28 are added on the top of the CR cementitious binder 26 to form the rubber granules 28 upper layer. The final setting time of the cemented rubber layer 24 is about 4-8 hours and the 3-day compressive strength of the cemented rubber layer 24 is about 10-30 MPa.

The following is the particular exemplary composition of the CR cementitious binder 26:

TABLE 2

| Cement | Fly ash | Silica fume | Sand | Water\Binder | Superplasticizer\Binder | EPDM Rubber |
|---|---|---|---|---|---|---|
| 20% | 25% | 5% | 50% | 0.28% | 0.4% | 20% |

Experimental Example 2

The surface modification of rubber granules 28 is illustrated in this example. In order to improve the hydrophilicity of the rubber granules 28, the carboxyl groups of the rubber granules 28 are hydrolyzed by high concentrated sodium hydroxide solution.

The rubber granules 28 used in this example is Ethylene Propylene Diene Monomer (EPDM) rubber granules with granule sizes of 2-4 mm. Weighted EPDM rubber granules of 1 kg are added to a sodium hydroxide solution of 12.5 M of form a mixture. The mixture is stirred for 20 minutes and the rubber granules 28 are filtered. The rubber granules 28 are washed with running de-ionized water and dried in room temperature.

Experimental Example 3

The impact sound insulated property of the composite floor underlayment is illustrated in this example. In this example, two samples 46 are tested. Sample one (cemented rubber layer) is the cemented rubber layer 24 and sample two (composite floor underlayment system) is the floor underlayment 20. For sample two, the floor underlayment 20 comprises the impact sound insulated cemented rubber layer 24 and the HDCC 22 screed. The precast sample cemented rubber layer 24 of size 600 mm×600 mm×15 mm with the HDCC 22 screed on top of the cemented rubber layer 24 of dimension 600 mm×600 mm×25 mm are prepared. The sample is cured of temperature 25° C. and humidity 98% for 28 days. Sample 1 only comprises the impact sound insulated cemented rubber layer 24 of 600 mm×600 mm×15 mm.

Figure 7:
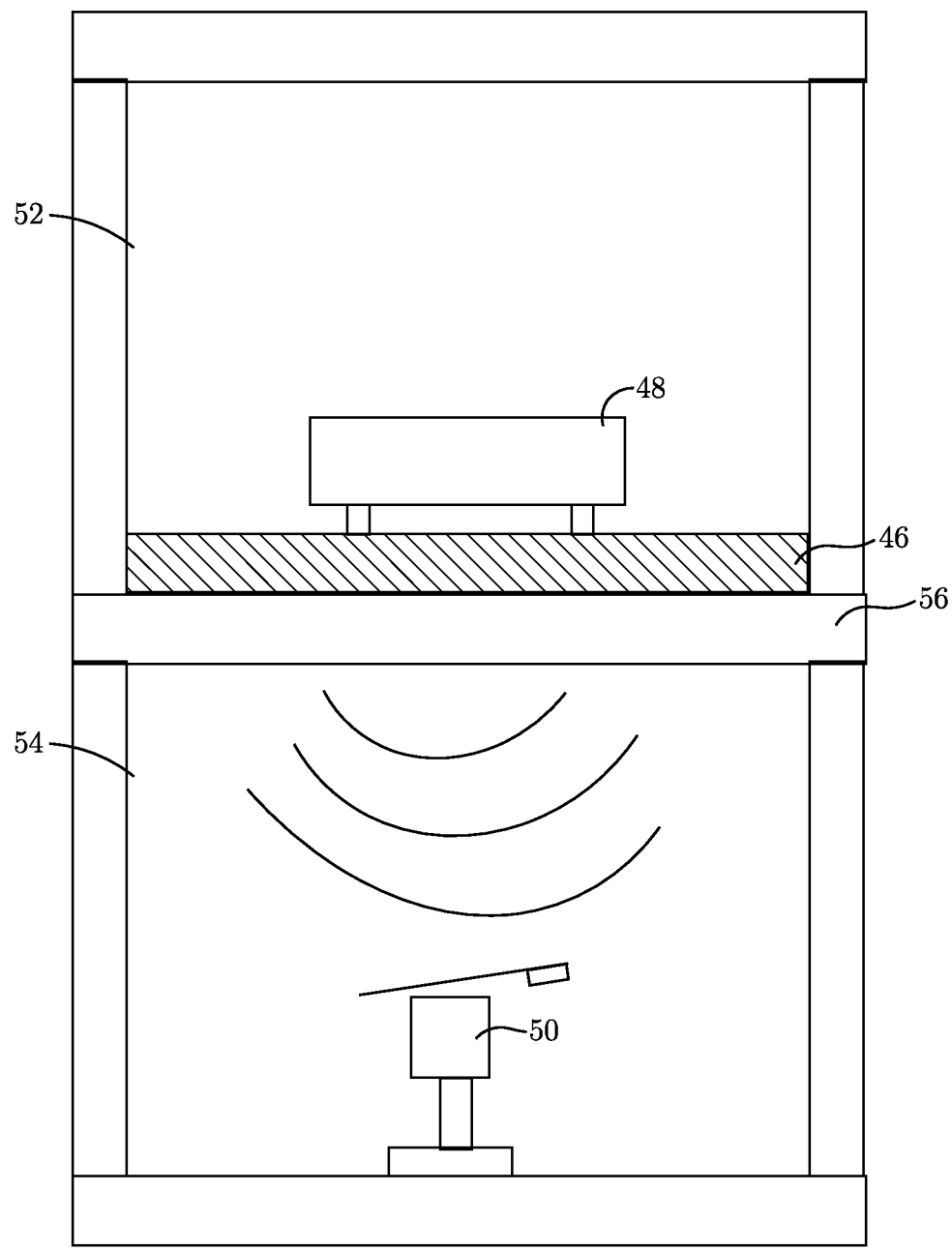
FIG. 7 is a schematic diagram of showing the set-up of the impact sound insulation performance test for the present invention.

In order to measure the impact sound insulation of the specimens, a tapping machine 48 and a sound level meter 50 as shown in FIG. 7 are prepared. The tapping machine 48 is a normalized impact noise generator for the measurement of sound insulation of floors according to ISO 140-6, ISO 140-7, ISO 140-8, ASTM E492 and ASEM E1007. The tapping machine 48 has five hammers in line driven by a motor controlled by an electronic system. The hammers are made of stainless steel, hardened and dimensionally stable over time. The fall height of the hammers is 40 mm and the average tapping interval is about 100 ms. The sound level meter 8 is a device to measure the impact sound with the measured frequency range from 31.5 Hz to 8000 Hz and sound level of 30-130 dB.

To simulate the real situation, a source room 52 (the room for generating the impact noise) and a receiving room 54 (the room for measuring the impact noise) in a two story building are prepared as shown in FIG. 7. The thickness of the concrete slab 56 between the source room 52 and the receiving room 54 is about 200 mm. As shown in FIG. 7, the tapping machine 48 is located directly on the top of the prepared sample to allow the hammers of the tapping machine 48 hitting the top surface of the sample perpendicularly. The tapping machine 48 in the source room 52 is operated during the measurement in which the impact sound which is transmitted from the source room 52 to the receiving room 54. For each tested sample, 3 minutes of sound measurement in the receiving room 54 by the sound level meter 50 is recorded. According to the recorded data, the average sound measurement value is calculated.

Figure 8:
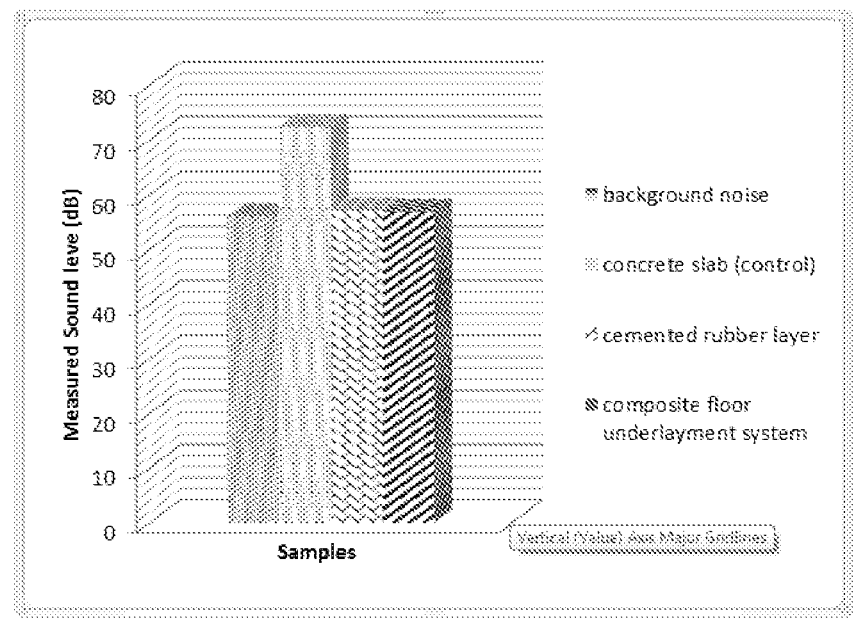
FIG. 8 is a chart illustrating the impact sound insulation performance of the present invention.

In this example, four measurements are performed. Measurement of the background noise in the receiving room 54 is considered as the first measurement. Then the tapping machine 48 is located on the top surface of the concrete slab 56 in which the impact sound transmitted from the source room 52 to receiving room 54, which is considered as a control data is the second measurement. For the third and fourth measurements, the tapping machine 48 is located on the sample one and the sample two respectively and impact sound transmitted through the samples to the receiving room 54 is recorded. The results of the impact sound insulation test are shown in FIG. 8. The background noise of the receiving room 54 is 56 dB and the average sound level increases to 72.4 dB when tapping machine 48 is operated on the concrete slab 56. When the sample one is placed between the concrete slab 56 and the tapping machine 48, the measured average sound level reduces to 57.1 dB. When the sample two is tested, the average sound level is 56.8 dB which is similar to the result of the sample one. This example illustrates that the presence of floor underlayment 20, or only the cemented rubber layer 24, can reduce the impact sound transmitted to the receiving room 54.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown in the accompanying drawing figures shall be interpreted as illustrative only and not in a limiting sense.

The following claims should not be read as limited to the described order or elements unless stated to that effect. Therefore, all statements of the scope of the invention which, as a matter of language, might be said to fall therebetween.

For example, the superplasticizer can be naphthalene sulphonate based superplasticizer with a chemical formula of $([C_{10}H_7NaO_3S][CH_2O])_n$ in both cemented rubber layer 24 and HDCC 22. The fiber used can be selected from the group of consisting of polypropylene fiber, polyethylene fiber, polyvinyl alcohol fiber, glass fiber, carbon fiber and any combination thereof. The short fiber used can be selected from the group of consisting of polyvinyl alcohol short fiber, polyethylene short fiber, glass short fiber, carbon short fiber and any combination thereof. The rubber granules 28 used can be selected from the group consisting of Ethylene Propylene Diene Monomer (EPDM) rubber granules, Styrene-butadiene rubber granules, Butyl rubber granules, Silicone rubber granules and any combination thereof. The rubber granules 28 used can be non-recycled rubber granules 28. Further, organosilane with the formula of $(OCH_2CH_2CH_2OCH_2CH_2CH_2Si(OXH_3)_3)$ can be used as the silane coupling agent as well. Also, calcium hydroxide $(Ca(OH)_2)$ can be used as alkaline. Besides, the floor underlayment 20 can be used in the making of a wall. Furthermore, slag and/or fiber is/are optional material(s) for the CR cementitious binder 26.

In addition, the cemented rubber layer 24 can be thicker than the HDCC 22 layer. Furthermore, the cemented rubber layer 24 can be placed on top of the HDCC 22 layer. Also, the overall thicknesses of the floor underlayment 20, cemented rubber layer 24 and HDCC 22 can be varied to fit specific needs despite of what is disclosed above. Alternatively, the floor underlayment can be precasted instead of being formed in-situ as stated above.

Further, the floor underlayment has a surface flame resistance classified of Class A1 to Class C according to BS EN 13501-1:2007.

What is claimed:

1. A method of installing an underlayment on a floor in a building comprising a step of:
    a) forming a cementitious binder layer on said floor;
    b) adding rubber granules onto said cementitious binder layer to form a cementitious-binder-rubber sheet on said floor; and
    c) settling said cementitious-binder-rubber sheet for a predetermined period of time; and
    d) casting a highly deformable cementitious composite layer onto said cementitious-binder-rubber sheet.

2. The method of claim 1, wherein said highly deformable cementitious composite layer is made of a fiber reinforced cementitious composite comprising cement, fly ash, slag, silica fume, sand, superplasticizer, and short fiber.

3. The method of claim 1, wherein said cementitious-binder-rubber sheet further comprises an upper layer and a lower layer, wherein said upper layer comprises substantially said rubber granules.

4. The method of claim 1, wherein said rubber granules are pre-treated by the steps of:
    a) providing a recycled rubber granules which are selected from the group consisting of Ethylene Propylene Diene Monomer (EPDM) rubber granules, Styrene-butadiene rubber granules, Butyl rubber granules, Silicone rubber granules and any combination thereof; and
    b) treating said recycled rubber granules with sodium hydroxide solution or calcium hydroxide solution.

5. The method of claim 1, wherein said rubber granules are pre-treated by the steps of:
    a) providing a recycled rubber granules which are selected from the group consisting of Ethylene Propylene Diene Monomer (EPDM) rubber granules, Styrene-butadiene rubber granules, Butyl rubber granules, Silicone rubber granules and any combination thereof; and
    b) treating said recycled rubber granules with silane coupling agent.

6. The method of claim 1, wherein said cementitious binder layer comprises cement, fly ash, silica fume, sand, water, and superplasticizer.

* * * * *